May 15, 1951 J. CIRONE 2,552,665
ACCELERATOR ACTUATED SWITCH FOR SIGNAL LIGHTS
Filed Dec. 12, 1949

Joseph Cirone
INVENTOR.

BY Clarence A. O'Brien
and Harvey B. Jacobson
Attorneys

Patented May 15, 1951

2,552,665

UNITED STATES PATENT OFFICE 2,552,665

ACCELERATOR ACTUATED SWITCH FOR SIGNAL LIGHTS

Joseph Cirone, Ridgefield, N. J.

Application December 12, 1949, Serial No. 132,538

2 Claims. (Cl. 200—59)

This invention appertains to safety signalling devices for automobiles and has for its primary object to reduce to a minimum the time required, during an emergency, to apprise the drivers of following vehicles regarding the braking of further directional progress of a vehicle.

Another important object of this invention is to provide means for instantly actuating a stopping or slowing down signal lamp, mounted on the rear of a vehicle, the means being instantly controlled by the throttle shaft and lever assembly of a carburetor.

Another important object of this invention is to provide means, whereby instant removal of pressure from the foot throttle or accelerator in a vehicle, will close a circuit to a rear "alerting" light on the vehicle to indicate the driver's intention to brake against further directional progress of the vehicle and the condition of the vehicle's forward movement.

Another important object of this invention is to provide means for controlling an electrical circuit or an "alerting" light on the rear of a vehicle, the means being associated with the carburetor and accelerator rod of a vehicle.

Figure 1:
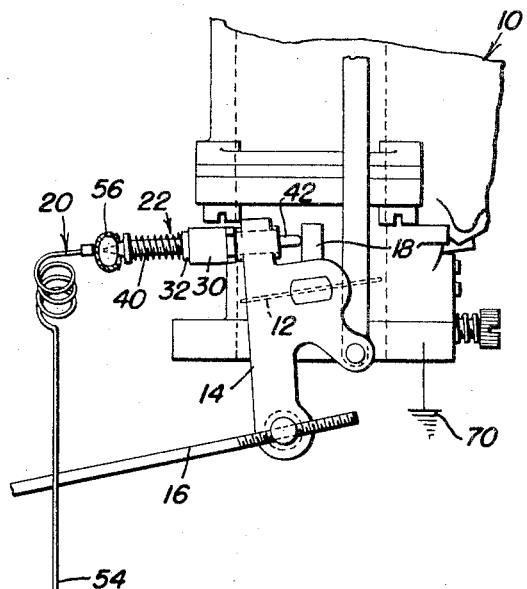
Figure 2:
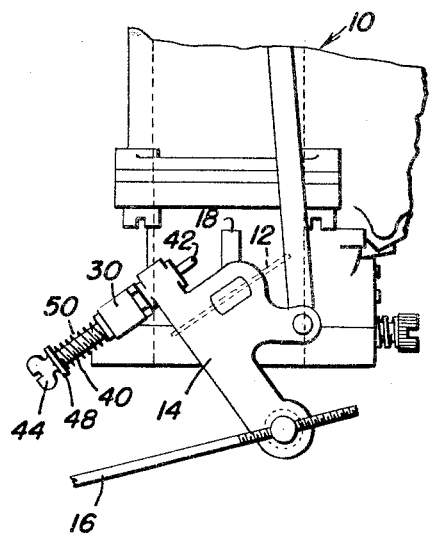
Figure 3:
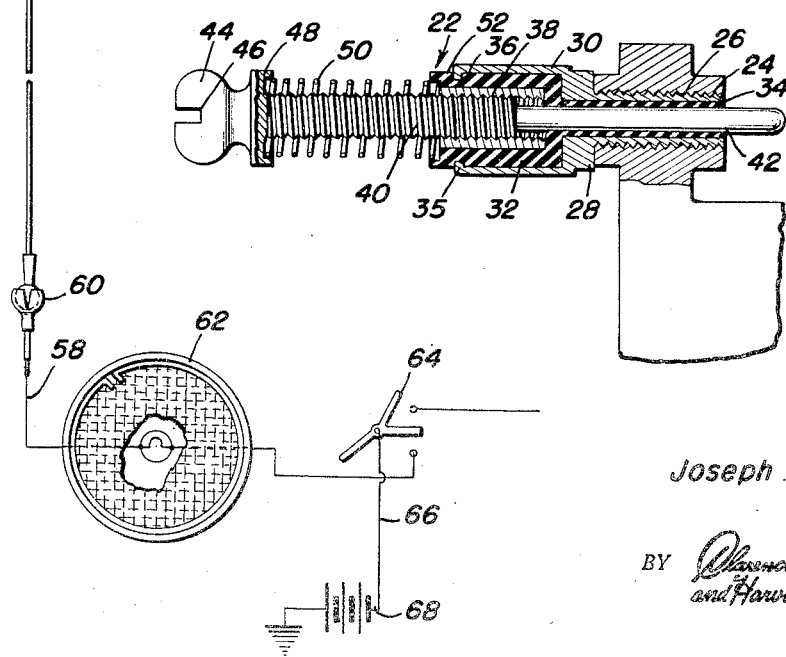

These and ancillary objects and structural features of merit are attained by this invention, the preferred embodiment of which is set forth in the following description and illustrated in the accompanying drawings, wherein:

Figure 1 is a schematic diagram of an automotive vehicle with a portion of the carburetor being shown in elevation and having the signalling unit secured thereto and illustrating the same in an operative position;

Figure 2 is a fragmentary elevational view of the carburetor of the internal combustion engine of a motor vehicle, with a portion of the unit, constructed in accordance with this invention, illustrated in connection therewith; and, Figure 3 is a longitudinal vertical sectional view of the adjustable throttle screw and associated structure, the throttle screw serving as the ground for the signal lamp circuit.

In the accompanying drawing, the reference numeral 10 generally indicates a conventional carburetor for an internal combustion engine, employed in a conventional motor vehicle. The carburetor is conventionally constructed with an air passage, within which a butterfly valve 12 is transversely journaled. The butterfly valve or plate 12 is oscillatably mounted in the air passage and its movements are controlled by a pivoted external lever 14, to which an accelerator rod 16 is adjustably secured. The accelerator rod, of course, is connected by a suitable linkage to the accelerator or foot pedal mounted on the floorboards within the motor vehicle. A stop block 18 is laterally formed on the exterior of the carburetor housing and normally a throttle screw is carried by the upper end of the member 14 and is adapted to contact the block 18 and thereby retain the valve 12 in adjusted closed position.

This invention generally designated by the reference numeral 20 includes a ground assembly or unit 22, the latter functioning also as the throttle screw for the actuating member 14 of the butterfly valve. The upper end of the member 14 is transversely bored and threaded as at 24 to receive an externally threaded sleeve 26. The sleeve is formed at one end with an enlarged shoulder 28 and the shoulder abuts against the end of the member 14. A socket 30 is formed on the end of the sleeve and extends from the shoulder 28, the socket being axially aligned with the sleeve. An insulating bushing 32 is disposed within the socket 30 and is formed with a coaxially reduced projecting sleeve 34, the latter being frictionally fitted within the sleeve 26. The bushing is secured within the socketed sleeve by means of a bent over lateral tongue 35 formed on the outer end of the socket 30 and seated in an annular groove or recess 36 in the bushing. An internally threaded metal sleeve 38 is disposed within the insulating bushing 32 and an elongated throttle screw 40 is threaded therein. The throttle screw terminates in an axially reduced plane end 42, which passes through the sleeve 34 and is adapted to abut against the stop member or block 18.

The throttle screw is formed at its opposing end with an enlarged head 44 having a transverse kerf 46 formed therein and with an annular collar 48. A spring 50 is concentrically disposed about the screw, the spring having one end seated in the collar 48 and the opposing end seated in an annular seat 52 formed in the outer end of the bushing 32.

An electrical conductor 54 is attached to the head 44 of the screw by means of a metal snap clip 56, which is frictionally fitted on the head. Of course, the conductor is suitably insulated and is connected to a connecting wire 58 by means of a snap connection 60. The connecting wire 58 is wired to a signal lamp 62 and is wired to the ignition switch 64. Of course, a connecting wire 66 extends from the battery 68 to the ignition switch and completes the circuit. It is to be noted that the circuit is grounded as at 70 by means of the throttle screw, the circuit being grounded when the extending end of the throttle screw is in contact with the block 18.

It can thus be seen that when the vehicle is being accelerated, the signal lamp 62 will be extinguished, since the circuit will be broken, as the actuating member 14 is moved rearwardly. However, when pressure on the foot pedal or accelerator is released, the member 14 will move forwardly and the throttle screw will abut against the stop member 18. Immediately, the circuit is completed from the battery 68 through to the carburetor housing and the lamp 62 is illuminated. Thus, the lamp is illuminated immediately upon the operator's withdrawal of his foot from the accelerator pedal and it is to be especially noted that there is no time element involved and that the illumination of the lamp is not dependent upon any mechanical linkage, which would have a tendency to wear and be subjected to damage and slippage after extensive use.

Having described the invention, what is claimed as new is:

1. In combination with the carburetor of an internal combustion engine for a vehicle, said carburetor having an air passage with a butterfly valve journaled in said passage and an actuating member for said valve mounted on the carburetor housing and operated by a throttle shaft, an electrical circuit connected to the source of electrical energy for the vehicle, a stop member on said carburetor, an insulated adjustable throttle screw carried by the actuating member for the valve in the carburetor, detachable clamping means connecting the screw with the circuit, whereby the circuit is grounded and completed when the screw is in contact with the stop member during deceleration of the engine.

2. In combination with the carburetor of an internal combustion engine for a vehicle, said carburetor having an air passage with a butterfly valve journaled in said passage and an actuating member for said valve mounted on the carburetor housing and operated by a throttle shaft, an electrical circuit connected to the source of electrical energy for the vehicle, a stop member on said carburetor, an insulated adjustable throttle screw carried by the actuating member for the valve in the carburetor, detachable clamping means connecting the screw with the circuit, whereby the circuit is grounded and completed when the screw is in contact with the stop member during deceleration of the engine, said actuating member having an internally threaded aperture therethrough, said throttle screw comprising a sleeve member threadedly secured in said aperture, an insulative bushing in said sleeve member, means retaining said bushing in said sleeve member, an inner internally threaded sleeve member disposed within said bushing, an elongated threaded member threadedly secured to said inner sleeve and extending through said bushing and through said threaded aperture in said actuating member for contact with said stop member, said clamping means being secured to said elongated threaded member, and spring means biasing said elongated threaded member and said bushing.

JOSEPH CIRONE.

REFERENCES CITED

The following references are of record in the file of this patent:

UNITED STATES PATENTS

| Number | Name | Date |
|---|---|---|
| 1,283,801 | Kincaid | Nov. 5, 1918 |
| 1,643,575 | Clark | Sept. 27, 1927 |
| 1,956,056 | Bellec et al. | Apr. 24, 1934 |
| 2,128,769 | Finnell | Aug. 30, 1938 |
| 2,250,587 | Larson | July 29, 1946 |
| 2,463,088 | Coombs | Mar. 1, 1949 |